(12) United States Patent
Johnson et al.

(10) Patent No.: US 10,977,238 B2
(45) Date of Patent: Apr. 13, 2021

(54) VALIDITY MAP-BASED TRACKING OF USER DATA UPDATES

(71) Applicant: Amazon Technologies, Inc., Seattle, WA (US)

(72) Inventors: Jeffrey Arthur Johnson, Seattle, WA (US); Mark Christopher Seigle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 15/658,283

(22) Filed: Jul. 24, 2017

(65) Prior Publication Data

US 2018/0011894 A1     Jan. 11, 2018

Related U.S. Application Data

(63) Continuation of application No. 14/136,538, filed on Dec. 20, 2013, now Pat. No. 9,715,520.

(51) Int. Cl.
*G06F 16/00*     (2019.01)
*G06F 16/23*     (2019.01)

(52) U.S. Cl.
CPC ................. *G06F 16/2365* (2019.01)

(58) Field of Classification Search
CPC ....... G06F 16/2365; G06F 11/08; G06F 11/14
See application file for complete search history.

(56) References Cited

U.S. PATENT DOCUMENTS

| | | | |
|---|---|---|---|
| 6,751,636 B1 | 6/2004 | Mende, Jr. et al. | |
| 8,805,967 B2 | 8/2014 | Taylor et al. | |
| 9,715,520 B1* | 7/2017 | Johnson | G06F 16/2365 |
| 9,811,268 B2* | 11/2017 | Schuster | G06F 3/0611 |
| 2003/0074343 A1* | 4/2003 | Onuki | G06F 21/6245 |
| 2003/0135349 A1 | 7/2003 | Yoshie et al. | |
| 2005/0256796 A1* | 11/2005 | Haga | G06Q 50/16 |
| | | | 705/313 |
| 2006/0059344 A1 | 3/2006 | Mononen | |
| 2007/0050777 A1 | 3/2007 | Hutchinson et al. | |
| 2007/0061279 A1* | 3/2007 | Christiansen | G06F 11/008 |
| 2007/0079087 A1* | 4/2007 | Wang | G06F 11/1461 |
| | | | 711/161 |
| 2007/0143740 A1* | 6/2007 | Hoerentrup | G06F 16/10 |
| | | | 717/120 |
| 2008/0065703 A1* | 3/2008 | Wang | G06F 1/3268 |
| 2008/0077590 A1 | 3/2008 | Pandit | |
| 2013/0110779 A1 | 5/2013 | Taylor et al. | |
| 2013/0198223 A1* | 8/2013 | Ahmed | G06F 16/2365 |
| | | | 707/769 |
| 2013/0311733 A1* | 11/2013 | Miller | G06F 9/466 |
| | | | 711/162 |

(Continued)

*Primary Examiner* — Noosha Arjomandi
(74) *Attorney, Agent, or Firm* — Davis Wright Tremaine LLP

(57) ABSTRACT

A method and apparatus is disclosed for utilizing a validity map to indicate whether an overwriting data portion of user data is received. In the method and apparatus, a plurality of data portions of user data are received, whereby each data portion of the plurality of data portion may overwrite another data portion. A validity map may be utilized to indicate whether a data portion is an overwriting data portion. The validity map may be utilized for retrieving the data portion instead of the data portion being replaced.

20 Claims, 10 Drawing Sheets

(56) References Cited

U.S. PATENT DOCUMENTS

2014/0006357 A1   1/2014  Davis et al.
2014/0040213 A1   2/2014  Rossi
2014/0149355 A1   5/2014  Gupta et al.
2014/0310557 A1* 10/2014  Chambliss ............ G06F 3/0619
                                                  714/6.22

* cited by examiner

VALIDITY MAP-BASED TRACKING OF USER DATA UPDATES

CROSS-REFERENCE TO RELATED APPLICATION

This application is a continuation of U.S. application Ser. No. 14/136,538, filed Dec. 20, 2013, now U.S. Pat. No. 9,715,520, entitled "VALIDITY MAP-BASED TRACKING OF USER DATA UPDATES," the content of which is incorporated by reference herein in its entirety.

BACKGROUND

The use of network computing and storage has proliferated in recent years. The resources for network computing and storage are often provided by computing resource providers who leverage large-scale networks of computers, servers and storage drives to enable customers to host and execute a variety of applications and web services. The customers, who traditionally used on-site servers and storage equipment to meet their computing demands often forego on-site hosting and storage and turn to using the resources of the computing resource providers. The usage of network computing allows the customers to efficiently and adaptively satisfy their computing needs. Further, the customer may utilize the resources of computing resource providers to archive large volumes of data. Archival and other data storage services may employ redundancy techniques to ensure that archived data may be recovered in the event of one or more storage device failures.

To archive a large volume of data, a user may upload the volume in multiple parts, whereby it may be challenging to ensure proper tracking of each part of the multiple part upload. It may also be challenging to ensure that a data part that overwrites a previously received data part is treated accordingly, whereby the previously received data part may be replaced by the overwriting data part.

BRIEF DESCRIPTION OF THE DRAWINGS

Various embodiments in accordance with the present disclosure will be described with reference to the drawings, in which.

DETAILED DESCRIPTION

Figure 1:
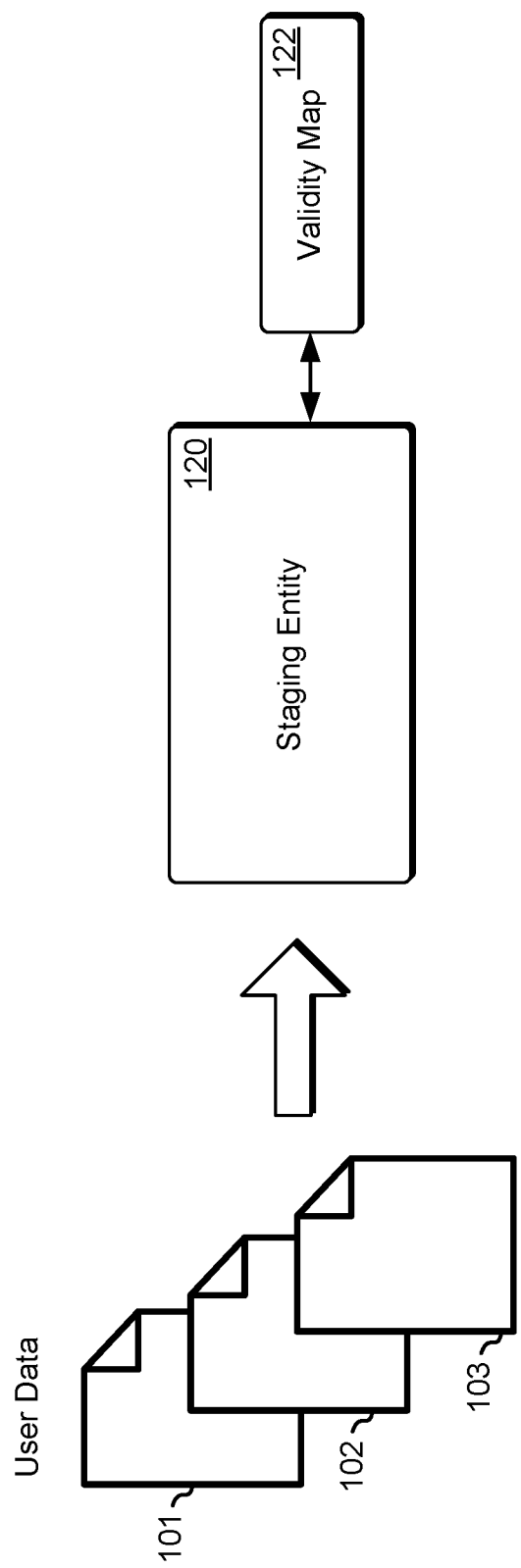
FIG. 1 shows an example of user data upload in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include utilizing a validity map to determine whether a stored data portion is valid or replaced by an overwriting data portion. A user may send data to a service for a variety of purposes. As described herein, the data may be raw data, which may be block-based data comprising one or more sequences of bits, bytes or packets of information. Further, the data may be computer-readable instructions, tasks, operations, an execution workflow as well as an outcome of a task, operation or an execution workflow, among other things. The user may send the data to be archived, processed or executed.

The data may be sectored into a plurality of data portions and the plurality of data portions may be sent to a staging entity together or separately. The staging entity may cause the received portions of the data to be stored pending receipt of remaining portions of the data. Further, the staging entity may perform a variety of operations on the data such as generating a digest for the data as described herein. When all of the data portions are received, the data portions may be provided to their intended destination. For example, the data portions may be provided to an archival service for storage or a computing service for execution.

Before or after the plurality of data portions are received by the staging entity, a user may seek to overwrite a data portion and replace the data portion with an overwriting data portion. The overwriting data portion may obviate the data portion and receipt of the overwriting data portion may cause the data portion to be ignored for the purposes of processing or storing the data. The staging entity may utilize a validity map to track whether an overwriting data portion is received.

As data portions are received from a user, the staging entity may cause the data portions to be stored in a first storage system, which may be an authoritative storage, such as a database. Further, the staging entity may cause the data portions to be stored in a second storage system (for example, a cache) to ensure that the data portions may be more expediently retrieved from the cache. The two storage system may have different performance characteristics. For example, a first storage system may be durable but may have higher retrieval times, whereas a second storage system may facilitate fast retrieval at the expense of durability. To avoid a two-phase commit problem that may arise when a data portion is stored in both the first storage system and the second storage system and an overwriting data portion is received replacing the data portion, a validity map is used. The validity map may be a bitmap including a string of bits, whereby each bit of the string of bits may be associated with a data portion of the user data. Each bit may indicate whether an overwriting data portion was received for its associated part.

When receiving a data portion of a multi-part data upload, the staging entity may determine whether the data portion overwrites an existing data portion. If it is determined that the data portion does not overwrite the existing data portion, the staging entity causes the data portion to be stored in authoritative storage. Further, the staging entity may cause the data portion to be stored in the cache to expedite retrieval. If, on the other hand, the staging entity determines that the data portion overwrites the existing data portion (for example, stored in the authoritative storage and the cache), the staging entity does not store the data portion in the cache. Instead, the staging entity retains the overwriting data portion in the authoritative storage and updates the validity to indicate that the data portion has been overwritten.

Upon determining that the data portions for the data upload have been received, the user data may be retrieved from the authoritative storage or the cache and sent to be persistently stored in an archival service. A retrieving entity may be tasked with retrieving the data portions and causing the data portions to be sent to the archival service. The retrieving entity may access the validity map and, for each data portion, determine whether the data portion was overwritten. If it is determined that the data portion was not overwritten, the data portion may be retrieved from the cache. If, on the other hand, the data portion was overwritten, the overwriting data portion may be retrieved from the authoritative storage, which may be associated with a slower retrieval time than the cache.

In some embodiments, the validity map may include one bit for each user upload, whereby the bit may indicate whether at least one portion of the user upload was overwritten or not. Upon completing the upload, the retrieval entity may inspect the validity map and may determine whether at least one portion of the user upload was overwritten. If a negative determination is made, all the data portions may be retrieved from the cache. If, on the other hand, a positive determination is made, all the data portions may be retrieved from the authoritative storage.

FIG. 1 shows an example of user data upload in accordance with at least one embodiment. User data comprising a plurality of portions 101-103 is received by a staging entity 120. The user data may be sent to the staging entity 120 for later processing or sending to archival storage. The staging entity 120 may store one or more of the plurality of portions 101-103 pending the receipt of the entirety of the user data or an expected amount of the user data. A portion of the user data may overwrite another portion of the user data, whereby upon receipt of the overwriting portion of the user data, the staging entity 120 may cause the overwriting portion to replace the other portion of the user data. Further, receipt of the overwriting portion may indicate to the staging entity 120 that the previously received user data is to be disregarded in favor of the overwriting portion. The staging entity 120 may utilize a validity map 122 to indicate whether the plurality of portions 101-103 of the user data are replaced by one or more overwriting data portions. Upon completion of the user data upload, the validity map 122 may be consulted to determine whether a received data portion is overwritten and to properly retrieve the data portions sought to be uploaded by the user. Upon retrieving, the data portions may be sent to a destination indicated by the user. For example, the user data may be sent to an archival storage to be backed-up or may be sent to computing service for execution.

Figure 2:
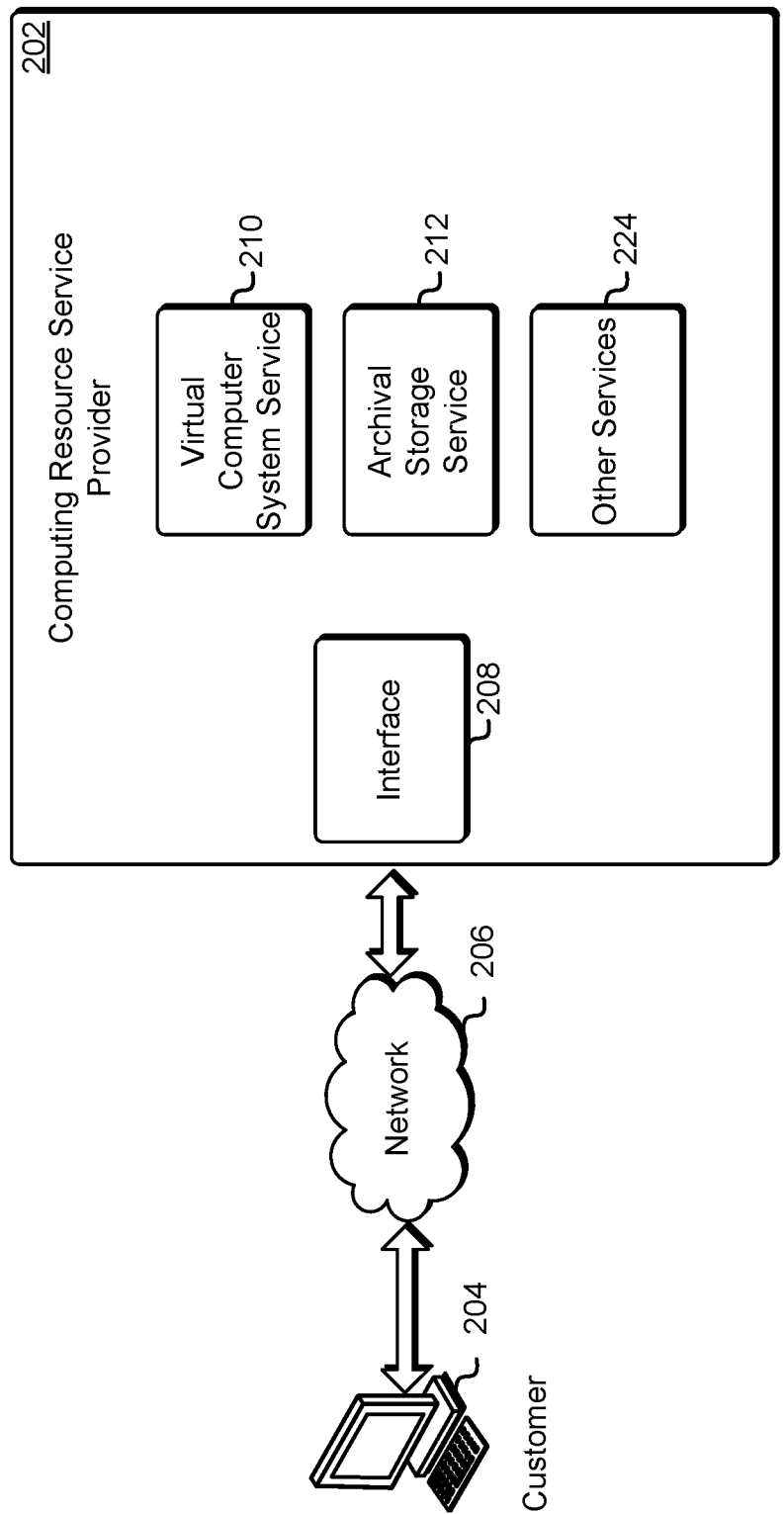
FIG. 2 shows an example of a customer connected to a computing resource service provider in accordance with at least one embodiment.

FIG. 2 shows an example of a customer connected to a computing resource service provider in accordance with at least one embodiment. The computing resource service provider 202 may provide a variety of services to the customer 204 and the customer 204 may communicate with the computing resource service provider 202 via an interface 208, which may be a web services interface or any other type of customer interface. While FIG. 2 shows one interface 208 for the services of the computing resource service provider 202, each service may have its own interface and, generally, subsets of the services may have corresponding interfaces in addition to or as an alternative to the interface 208.

The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network 206 may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 210, an archival storage service 212 and one or more other services 214. It is noted that not all embodiments described herein include the services 210-214 described with reference to FIG. 2 and additional services may be provided in addition to or as an alternative to services explicitly described herein. As described herein, each of the services 210-214 may include one or more web service interfaces that enable the customer 204 to submit appropriately configured application programming interface (API) calls to the various services through web service requests. In addition, each of the services may include one or more service interfaces that enable the services to access each other.

The virtual computer system service 210 may be a collection of computing resources configured to instantiate virtual machine instances on behalf of the customer 204. The customer 204 may interact with the virtual computer system service 210 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 210 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The computing resource service provider 202 further includes an archival storage service 212. The archival storage service 212 may comprise a collection of computing resources that collectively operate to provide storage for data archiving and backup of customer data. The data may comprise one or more data files that may be combined to form an archive. The archival storage service 212 may be configured to persistently store data that may be infrequently accessed and for which long retrieval times are acceptable to the customer 204. The customer 204 may interact with the archival storage service 212 (for example, through appropriately configured API calls made to the archival storage service 212) to generate one or more archives, upload and retrieve the one or more archives or monitor the generation, upload or retrieval of the one or more archives. To facilitate the upload of an archive, the customer 204 may upload the archive in one or more parts.

The computing resource service provider 202 additionally maintains one or more other services 214 based at least in part on the needs of its customer 204. For instance, the computing resource service provider 202 may maintain a database service. A database service may be a collection of computing resources that collectively operate to run one or more databases for one or more customers 204. The customer 204 may operate and manage a database from the database service by utilizing appropriately configured API calls. This, in turn, may allow a customer 204 to maintain and potentially scale the operations in the database. Other services include, but are not limited to, a block-level storage service, an on-demand storage service and services that manage and/or monitor other services. The on-demand storage service may enable quick location and retrieval of data so as to allow data to be provided in response to requests for the data.

Figure 3:
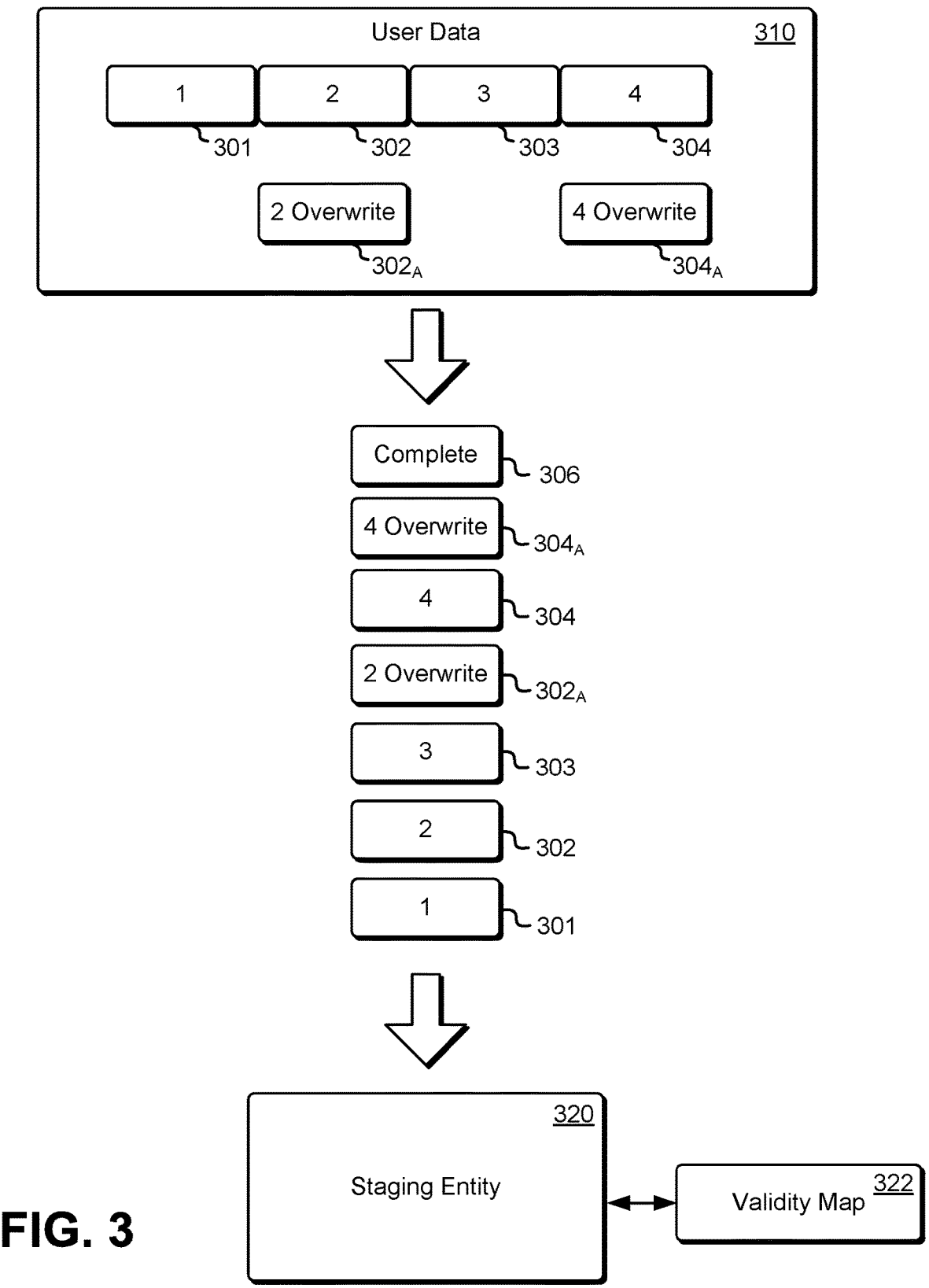
FIG. 3 shows an example of user data upload in accordance with at least one embodiment.

FIG. 3 shows an example of user data upload in accordance with at least one embodiment. The user data 310 comprises a plurality of data portions. The plurality of data portions are shown in FIG. 3 to include four data portions, whereby a first data portion is referred to herein as data portion 1 and is referenced by the numeral 301. Similarly, data portions 2-4 are referenced by the numerals 302-304, respectively. Data portion 2 302 and data portion 4 304 are each associated with an overwriting data portion, whereby data portion 2 302 is associated with overwriting portion 2 $302_A$ and data portion 4 is associated with overwriting portion 4 $304_A$. The user data 310 may be any type of data including raw data, which may be block-based data comprising one or more sequences of bits, bytes or packets of information that may have a pre-specified size and may be organized into sectors. The raw data may further be object-based data comprising variable-sized data structures including database tables, multimedia and the like. The raw data may further be a file system that organizes data in a hierarchy. The raw data may be locally stored (for example, using on-premises hard drives of a customer) and may be sought to be uploaded to be archived and persistently stored in remote storage (for example, in network-based storage of an archival storage service). The user data 310 may further be computer-readable instructions, tasks, operations or execution workflows including a plurality of operations. Accordingly, the user data 310 may be sent by a customer to be executed. Further, the user data 310 may be an outcome of the execution of a job, a task, an operation or an execution workflow. As described herein, the user data 310 may be segmented into a plurality of portions 301-304. For example, if the user data 310 is raw data, each portion may be a segment of a certain size. Further, if the user data 310 is a set of instructions or tasks that are sought to be executed, each portion may include one or more instructions or tasks of the set of instructions or tasks.

After sending a data portion, the user may seek to replace the data portion by an overwriting data portion. To do so, a user may send the overwriting data portion, whereby the overwriting data portion may supersede the associated data portion. Further, the overwriting data portion may supplant the data portion, whereby, for example, the overwriting data portion may be uploaded to archival storage instead of its associated data portion.

The user data 310 including the plurality of data portions 301-304, $302_A$, $304_A$ may be sent to a staging entity 320 separately or collectively. In order to initiate sending the user data 310, a command may be sent, for example, to the staging entity 310, indicating that upload of the user is to begin. The plurality of data portions 301-304, $302_A$, $304_A$ may further be sent to the staging entity 320 at different times or the sending of the two or more data portions may overlap in time. The staging entity 320 may enable collecting the plurality of data portions 301-304, $302_A$, $304_A$ of the user data 310 and retaining the plurality of data portions 301-304, $302_A$, $304_A$ of the user data 310 in one or more storage devices or media. The staging entity 320 may be an intermediary entity between one or more user devices that send the plurality of data portions 301-304, $302_A$, $304_A$ and a backend entity responsible for archiving the user data 310 or causing the execution of the instructions associated with the user data, among others.

Upon completing the sending of the plurality of portions 301-304, $302_A$, $304_A$ a command 306 indicating the completion is also sent to the staging entity 320. The command 320 may indicate that sending the user data 310 has been concluded and may trigger the staging entity 320 to perform an action on the user data 310, such as causing the user data 310 to be archived or causing the execution of one or more instructions specified by the user data 310.

As described herein, a data portion received at the staging entity 320 may be subsequently overwritten by another data portion referred to herein as an overwriting data portion. The overwriting data portion may be intended to replace the previously sent data portion, whereby the overwriting data portion, such as overwriting data portion $302_A$, may obviate the previously received data portion, such as data portion 2 302, and cause the associated data portion to become outdated. Accordingly, the staging entity 320 may neglect any retained data portion and perform any necessary action on the overwriting data portion. A data portion, such as data portions 301, 303, for which an overwriting data portion was not received may not be affected and may be processed accordingly by the staging entity 320.

User data 310 that is sent to the staging entity 320 may be associated with a user data identity. The user data identity may collectively identify the plurality of data portions that form the user data 310. The user data identity may be utilized to distinguish the user data 310 from other received data, such as data associated with a different user or a different set of user data associated with the same user (for example, a different set of user data that is uploaded to be archived). At any point in time a user may send more than one set of data to the staging entity 320, whereby each set of data may pertain to a different uploads. The user data identities of one or more sets of data may be used to distinguish between the various uploads. Further, each data portion 301-304, $302_A$, $304_A$ of the user data 310 may be associated with a data portion identity. The data portion identity may signify the placement of a data portion within the user data 310. For example, the data portion identity may signify that the data portion is the fifth data portion in an order arrangement of data portions.

An overwriting data portion may have the same identity as the data portion it is replacing. For example, data portion 2 302 and overwriting data portion $302_A$ may share the same data portion identity, which may indicate that the portions are the second part of a multi-part user data. The staging entity 320 may detect that a data portion is being overwritten if the staging entity 320 receives two or more data portions having the same data portion identity.

A validity map 322 is used to indicate whether received data includes an overwriting data portion. The validity map 322 may be implemented as a data store with dedicated bits having particular configurations that indicate whether the received user data 310 includes an overwriting portion. Upon receiving the plurality of portions 301-304, $302_A$, $304_A$, the staging entity 320 updates the validity map 322 to indicate whether an overwriting data portion was received. Updating the validity map 322 may include modifying one or more bits of the validity map 322 to signify that an overwriting data portion was received. Receipt of an overwriting data portion may require specific processing to be performed, for example, to ensure that an associated data portion is excluded from processing and that the overwrite portion is utilized.

As described herein, the staging entity 320 may be a collection of computing resources including, but not limited to one or more servers and storage devices, configured to receive one or more data portions of the user data, store the one or more data portions and update a validity map of the user data accordingly. The tasks performed by the staging entity may be distributed among the one or more servers. Further, each server may be access and update the validity map accordingly. For example, when a data portion and its corresponding overwriting data portion are received or processed by different servers, the server receiving or processing the overwriting data portion may update the validity map to indicate that the overwriting portion is received. The validity map 322 is then retained as a reference and access to the validity map may be provided to any other server or computing resource in order to determine whether one or more overwriting data portions were received. For example, if a data portion is an outcome of the execution of a task, an overwriting data portion may be a different outcome that is sought to replace the previous outcome. Accordingly, the validity map 322 may be used to track the various outcomes and specify whether one or more outcomes are replaced.

Figure 4:
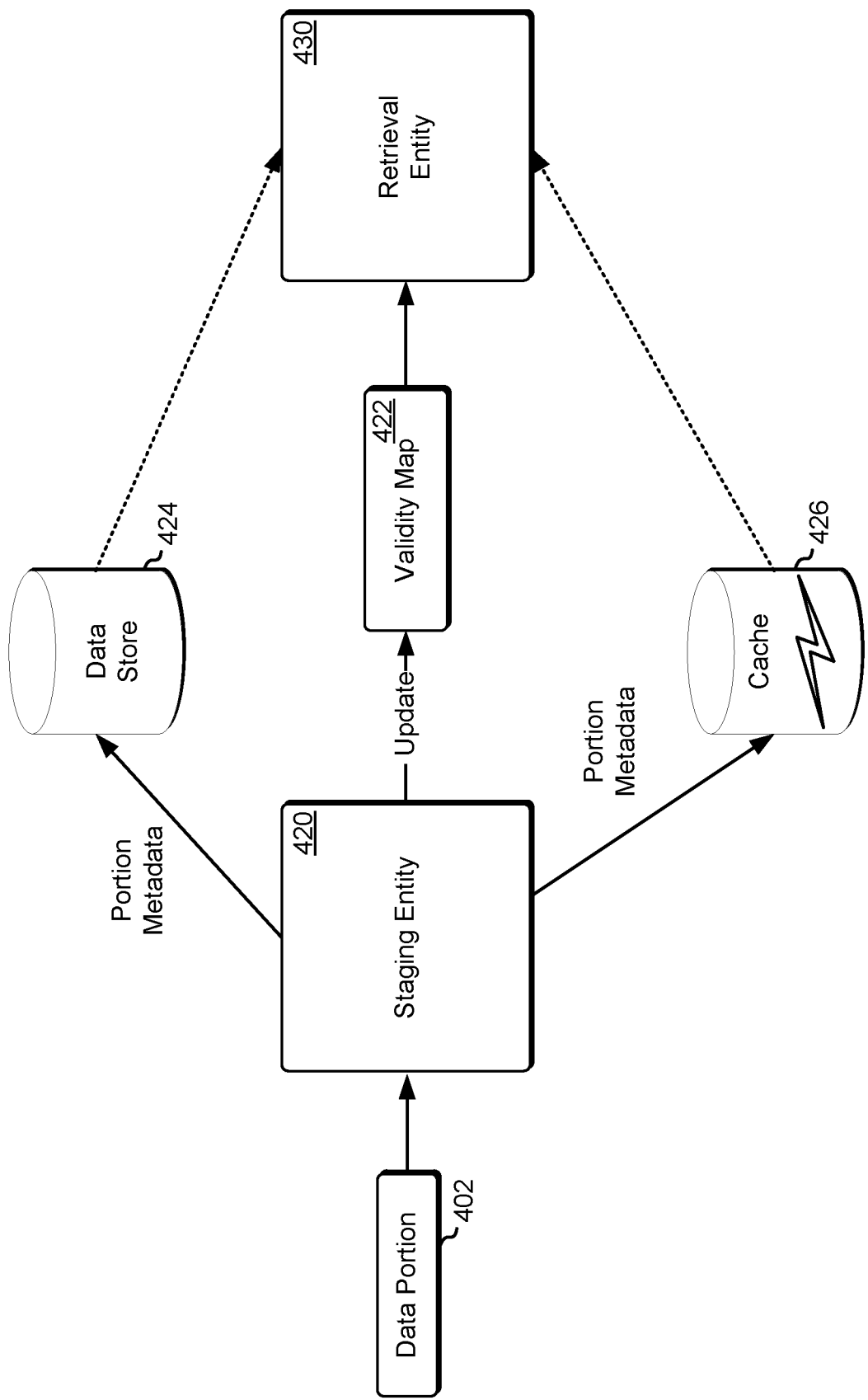
FIG. 4 shows an example of data portion processing using a validity map in accordance with at least one embodiment.

FIG. 4 shows an example of data portion processing using a validity map in accordance with at least one embodiment. A data portion 402 is received by a staging entity 420. The data portion 402 may be a compartmentalized portion of user data, whereby the user data may be sought to be uploaded for network-based persistent storage as described herein. Further, the data portion 402 may be an overwriting portion (for example, to a previously received data portion), a data portion that has an associated overwriting portion or a data portion that is not associated with an overwriting portion. The staging entity 420 may be configured to store metadata associated with the data portion 402 in a data store 424 and in a cache 426. The metadata may be retained in the data store 424 and the cache 426 until an upload complete command is received. Upon receipt of the upload complete command, the metadata associated with the data portion 402 as well as metadata associated with other received data portions may be retrieved from the data store 424 or the cache 426 by a retrieval entity 430. After retrieval, further processing may be performed on the data portion 402 or its metadata, whereby, for example, the data portion 402, other received data portions or metadata thereof may be persistently stored.

The staging entity 420 may generate metadata associated with the data portion 402. The metadata may include a digest for the data portion. The digest may be a hash value for the data portion 402 or a bit string that is generated by applying a cryptographic hash function to the data portion 402. The metadata may also include a time of receipt or an upload time of the data portion 402, a range value that specifies the positioning or placement of the data portion within a larger user data or an identity associated with the data portion 402 or the user data. In some embodiments, the metadata may include the data portion 402.

The staging entity 420 may determine whether the data portion 402 is an overwriting data portion for another data portion. If the staging entity determines that the data portion 402 is not an overwriting data portion, the staging entity 420 causes the metadata associated with the data portion 402 to be stored in the data store 424. The data store 424 may be associated with relatively slower retrieval time than the cache 426 and, accordingly, to expedite processing, the metadata may also be stored in the cache 426, which may facilitate faster retrieval. If the staging entity 420 determines that the data portion 402 is an overwriting data portion, the staging entity 420 may cause the validity map 422 to indicate that an overwriting data portion was received as described herein. Further, the staging entity 420 may cause the validity map 422 to indicate that the overwritten data portion stored in the cache is invalid. Accordingly, if the validity map 422 is consulted prior to utilizing the cache 426, the overwritten data portion stored in the cache 426 may be avoided. Instead the overwriting data portion may be retrieved from the data store 424. Accordingly, user data that is not associated with an overwriting data portion may be expediently retrieved from the cache 426. Further, when user data comprises both data portions that are overwritten and data portions that are not overwritten, the data portions that are overwritten may be retrieved from the data store 424, which may not be as expedient as the cache 426. In addition, the data portions that are not overwritten may be expediently retrieved from the cache 426.

Figure 5:
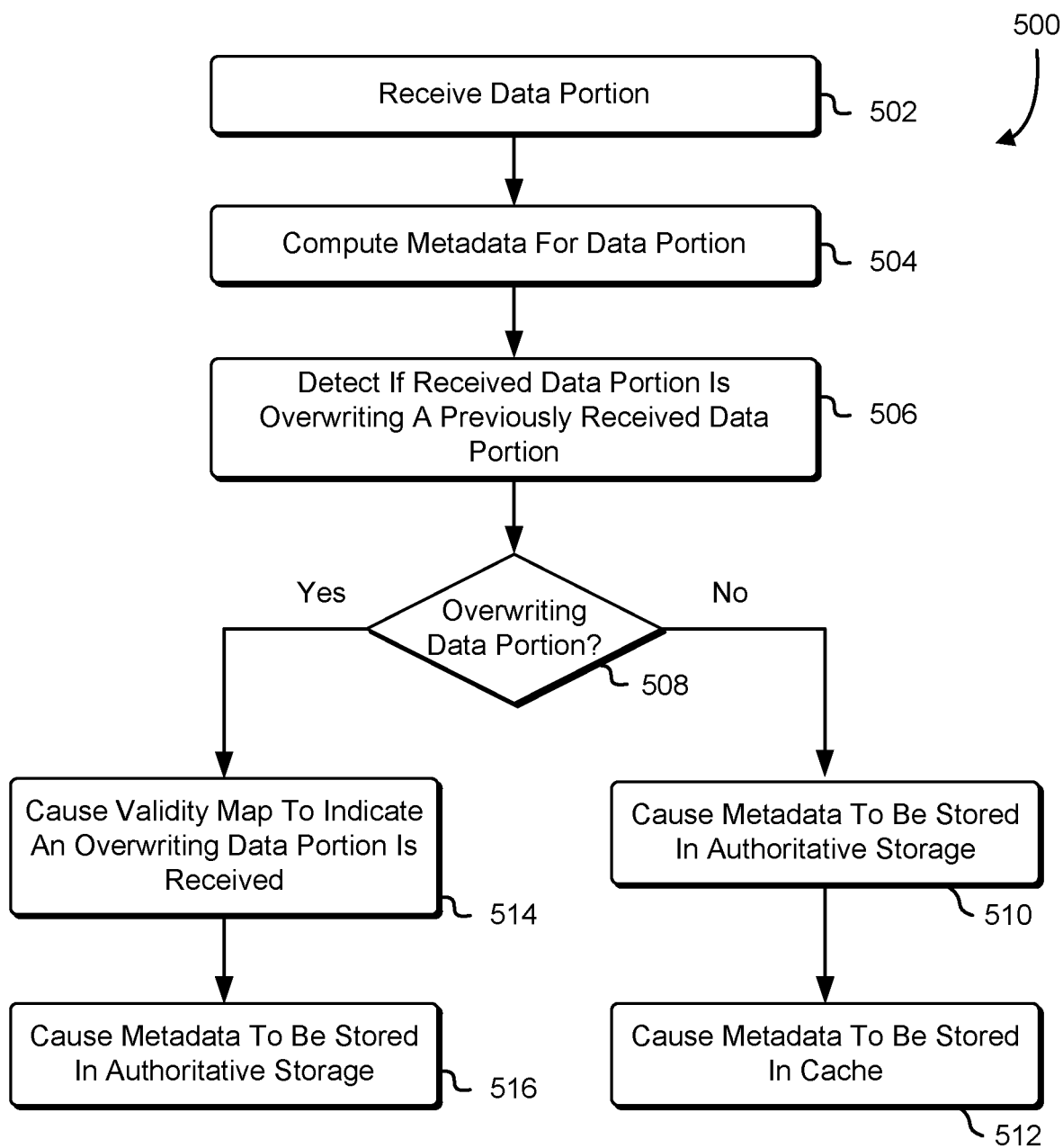
FIG. 5 shows an example of a method for updating a validity map in accordance with at least one embodiment.

FIG. 5 shows an example of a method for updating a validity map in accordance with at least one embodiment. In the process 500, a staging entity receives 502 a data portion. As described herein, the data portion may be a partitioned segment of any type of user data. The staging entity computes 504 metadata for the data portion. As described herein, the metadata may include a digest obtained by applying a hash function to the data portion. Further, in some embodiments, the metadata may include the data portion as received and without modification.

The authoritative storage may be any type of storage (such as a database) that is capable of persistently storing the data portion or metadata associated with the data portion. The staging entity then detects 506 whether the received data portion is overwriting a previously received data portion. The previously received data portion or its metadata may have been stored in the authoritative storage and the cache. If the staging entity determines 508 that the received data portion is not an overwriting data portion, the staging entity causes 510 the metadata associated with the data portion to be stored in authoritative storage. the staging entity also causes 514 the metadata associated with the data portion to be stored in the cache, whereby the data portion, if not subsequently overwritten, may be readily retrieved from the cache.

If the staging entity determines 508 that the received data portion is an overwriting data portion, the staging entity causes 514 a validity map to indicate that an overwriting data portion is received. The staging entity also causes 516 the metadata associated with the data portion to be stored in authoritative storage. As such, the validity map indicates that the cached version of the data portion is invalid due to the receipt of the overwriting data portion. Accordingly, the overwriting data portion may be retrieved from the authoritative storage while the cached data portion may not be utilized. Usage of the validity map facilitates an efficient resolution to the two-phase commit problem inherent in utilizing both the authoritative storage and the cache for storing a data portion and the potential for receipt of an overwriting data portion associated with the data portion. Without the validity map, no efficient mechanism is available for determining whether a cached data portion is valid. It is noted that a check may be performed to determine whether the validity map was successfully updated. If the validity map is not successfully updated to indicate that the received data portion is an overwriting data portion, updating the validity map may be subsequently reattempted to ensure that the validity map correctly reflects whether the received data portion is an overwriting data portion. Further, updating a validity map may include modifying one or more bits of a validity map that is stored locally or sending an instruction (for example, to another system that maintains the validity map) to modify one or more bits of a validity map and the like.

Figure 6:
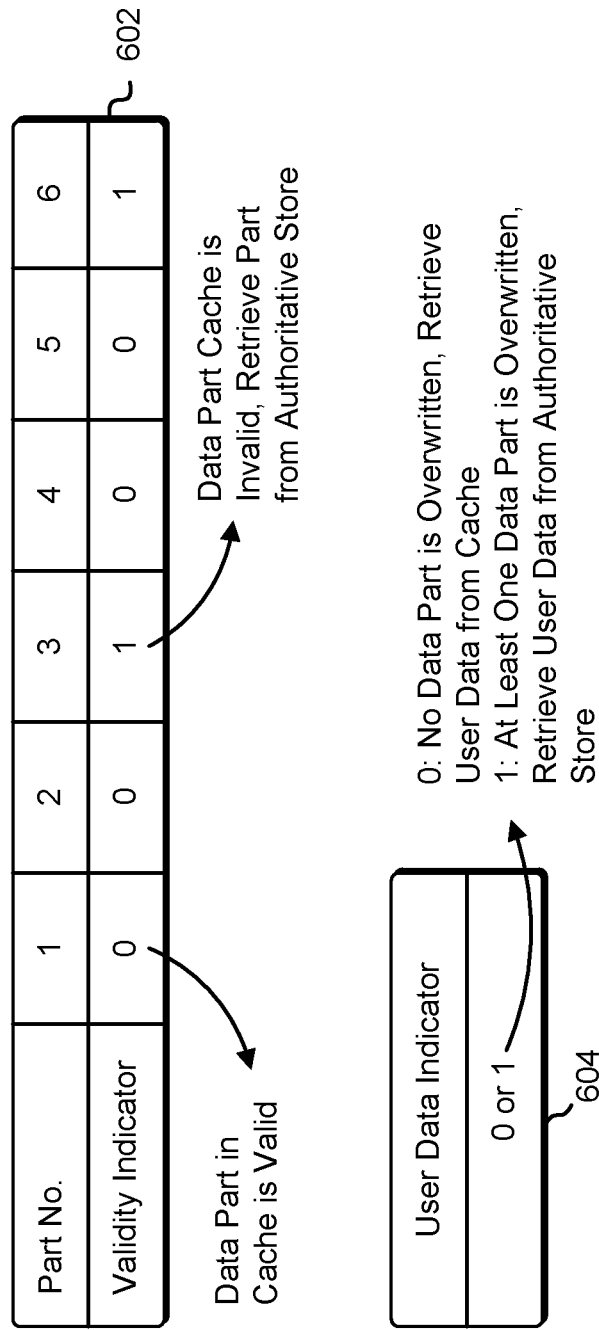
FIG. 6 shows examples of validity maps in accordance with at least one embodiment.

FIG. 6 shows examples of validity maps in accordance with at least one embodiment. The first validity map 602 shown in FIG. 6 associates each part of the user data with a validity indicator. The first validity map 602 may require that the number of parts be known prior to the commencement of receiving the parts. For each part of the user data, the validity indicator may be any one of two values, whereby a first value (for example, "0") may indicate that the part is not overwritten and, accordingly, the metadata associated with the part as stored in the cache is valid. A second value (for example, "1") may indicate that the part has been overwritten one or more times and, accordingly, the metadata associated with the part as stored in the cache is invalid and the overwriting part may be retrieved from a data store other than the cache. A staging entity may be configured to detect whether a received part overwrites an existing part stored in the cache. If the received part overwrites an existing part, the staging entity may update the validity indicator associated with the part to signify that the cached part is invalid.

The second validity map 604 associates user data in its entirety with one validity indicator. The validity indicator may be one of two values, whereby the first value (for example, "0") may indicate that no part of the user data is overwritten and, accordingly, the one or more parts of the user data stored in the cache are all valid. Further, because the one or more parts of the user data stored in the cache are all valid, the one or more parts may all be retrieved from the cache. The second value (for example, "1") of the validity indicator may indicate that at least one part of the user data is overwritten and, accordingly, at least one part of the user data stored in the cache is invalid. In contrast with the first validity map 602, the second validity map 604 may not specify which part of the user data is invalid and may only specify that at least one part of the user data is invalid. Accordingly, the second validity 604 may not be used to selectively retrieve various parts of the user data from the data store and the cache and, instead, may only be used to retrieve all the parts of the user data either from the cache or from the data store.

The indicator of the second validity map 604 may be initiated to the first value and may be changed to the second value upon receipt of a first overwriting part. If subsequent overwriting parts are received the indicator of the second validity map 604 may be kept to the second value. Further, once changed to the second value, subsequently received non-overwriting parts may not be stored in the cache and may only be stored in the data store as the non-overwriting parts may only be read from the data store.

Figure 7:
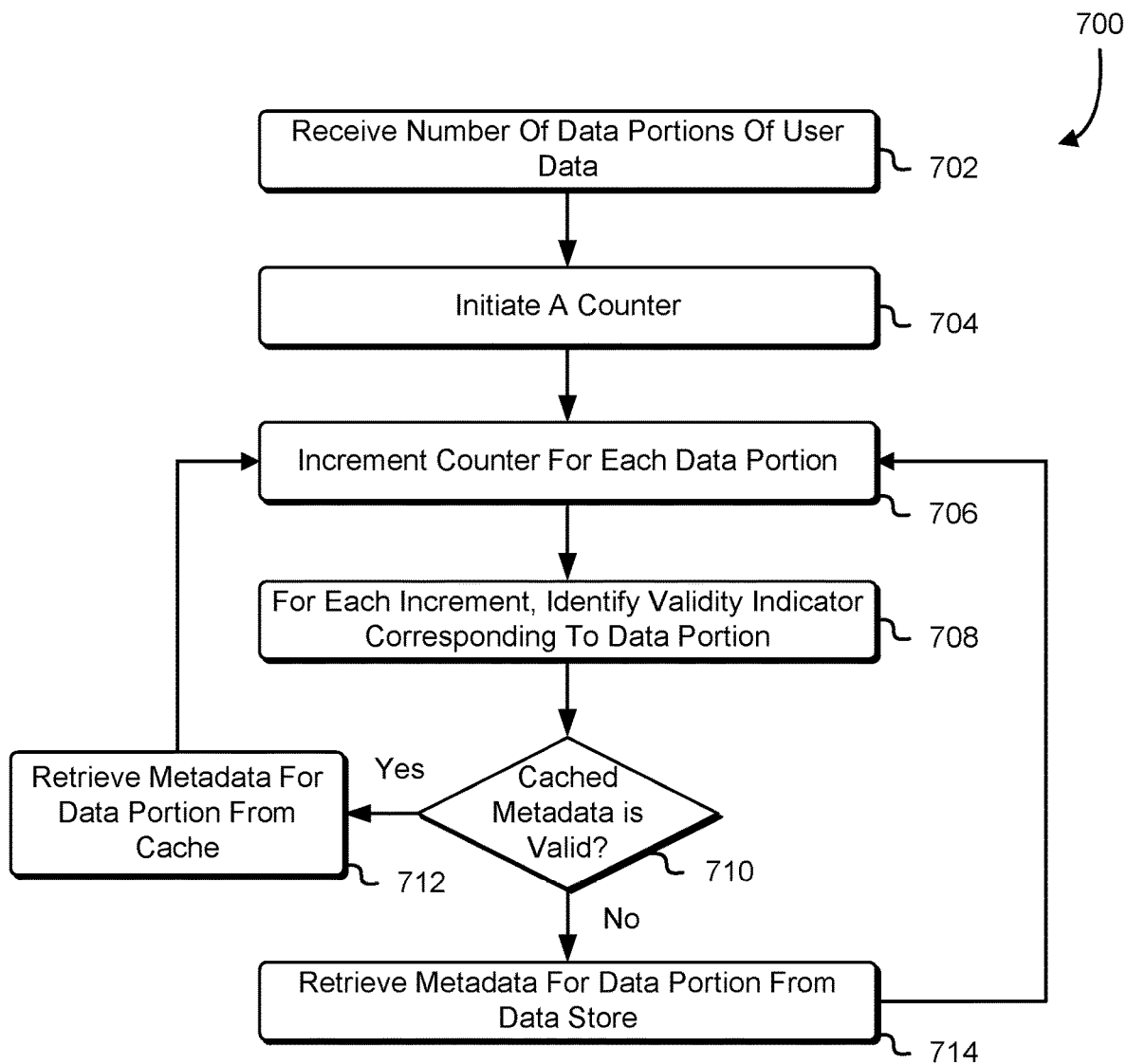
FIG. 7 shows an example of a method for retrieving one or more portions of user data in accordance with at least one embodiment.

FIG. 7 shows an example of a method for retrieving one or more portions of user data in accordance with at least one embodiment. The process 700 may commence upon receipt of a command indicating that all the data portions of the user data have been sent by the user. In the process 700, a retrieval entity receives 702 the number of data portions associated with user data. The retrieval entity may attempt to retrieve the data portions or the metadata associated with the data portions from a data store or a cache, for example, to be backed-up or archived in long-term storage. The retrieval entity may utilize a validity map, such as the validity map described with reference to numeral 602 in FIG. 6, to inspect a validity indicator associated with each data portion and determine whether to retrieve the data portion or the metadata associated with the data portion from the data store or the cache. If feasible, the data portion may advantageously be retrieved more expediently from the cache than the data store.

The retrieval entity then initiates 704 a counter and increments 706 the counter for each data portion of the plurality of data portions of user data. The retrieval entity identifies 708 a validity indicator corresponding to the data portion for each increment. The retrieval entity then determines 710 whether the cached metadata for the data portion is valid based at least in part on the validity indicator. If a positive determination is made, the metadata for the data portion is retrieved 712 from the cache. Further, after the data portion is retrieved from the cache, the process 700 proceeds to incrementing 706 the counter for a subsequent data portion. If a negative determination is made, the metadata for the data portion is retrieved 714 from the data store. Similarly, after the data portion is retrieved from the data store, the process 700 proceeds to incrementing 706 the counter for a subsequent data portion. It is noted, the process 700 terminates once a limit associated with the number of data portions is reached.

When user data is associated with one validity indicator, such as when utilizing the validity map described with reference to numeral 604 in FIG. 6, the user data in its entirety may be retrieved from either the cache or the data store. The user data validity map 604 is advantageous because it is more compact than the data portions validity map 602, whereby, for example, only one bit may be used to indicate the validity of the cache. However, because usage of the user data validity map 604 requires that all the user data be retrieved either from the cache or the data store, a performance penalty may be incurred when one or more data portions of the user data are overwritten whereas one or more other data portions of the user data are not overwritten. In this instance, the one or more other data portions that are not overwritten may be available for retrieval from the cache, for example, if validity map 602 was used.

Figure 8:
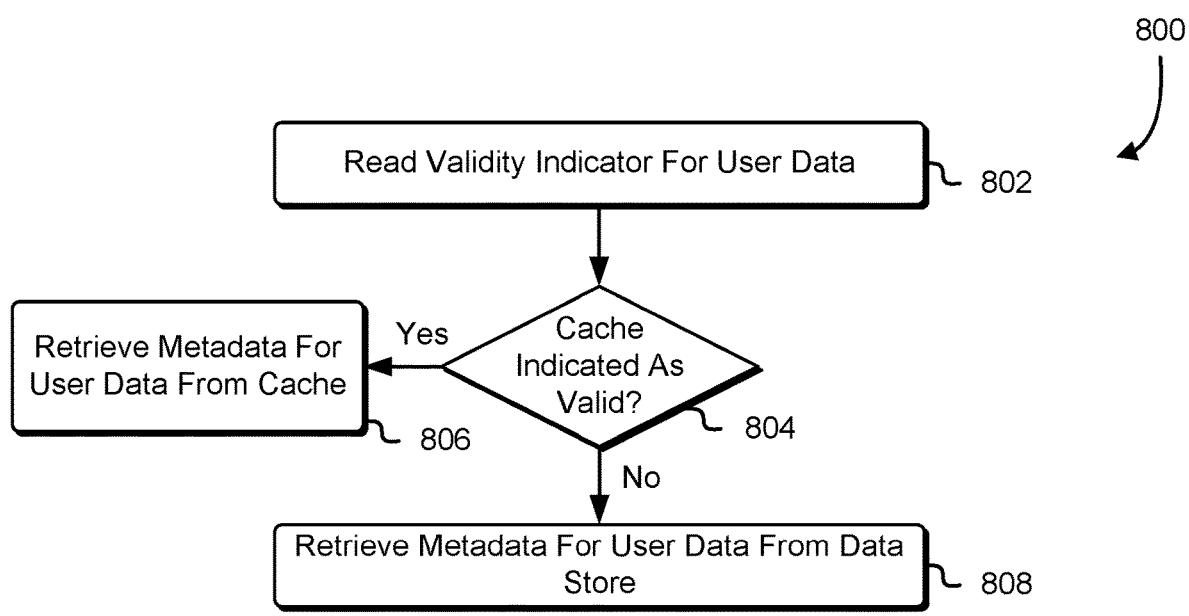
FIG. 8 shows an example of a method for retrieving user data in accordance with at least one embodiment.

FIG. 8 shows an example of a method for retrieving user data in accordance with at least one embodiment. In the process 800, a retrieving entity reads 802 a validity indicator for user data. The validity indicator may be associated with a validity map, such as the validity map described with reference to numeral 604 in FIG. 6, and may indicate whether one or more portions of the user data were overwritten. The retrieval entity then determines 804 whether the cache is valid based at least in part on the validity indicator, whereby if a positive determination is made, the retrieval entity retrieves 806 the metadata associated with all of the portions of the user data from the cache. Further, if a negative determination is made, the retrieval entity retrieves 808 the metadata associated with all of the portions of the user data from the data store.

Figure 9:
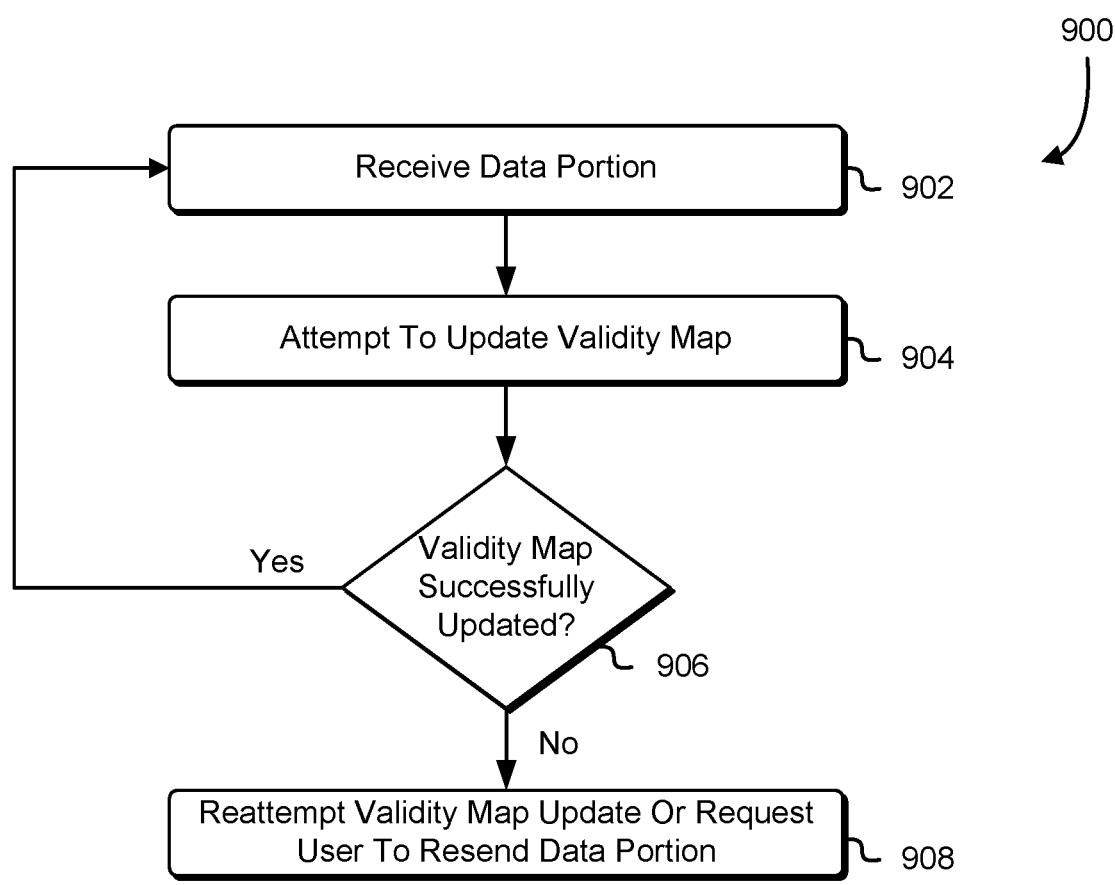
FIG. 9 shows an example of a method for updating a validity map in accordance with at least one embodiment.

FIG. 9 shows an example of a method for updating a validity map in accordance with at least one embodiment. In the process 900, a staging entity receives 902 a data portion, for example, from a user as described with reference to numeral 502 in FIG. 5. The staging entity then attempts 904 to update a validity map in accordance with the received request. For example, if the data portion overwrites a previously received data portion, the validity map may be updated to reflect receipt of an overwriting data portion. The staging entity then determines 906 whether the validity map was successfully updated. The validity map may be successfully updated if the validity map has been modified to correctly reflect that a particular data portion of the user data (for example, the received data portion) or any part of the user data has been overwritten. If a positive determination is made, the process 900 reverts to receiving 902 a forthcoming data portion. It is noted that steps 904-908 may be performed as part of causing a validity map to indicate that an overwriting data portion is received that is described with reference to numeral 514 in FIG. 5.

If, on the other hand, a negative determination is made, the staging entity reattempts 908 updating the validity map or requests the user to resend the data portion. It is noted that if the staging entity determines that the validity map is not successfully updated, the staging entity may consider that the user request for sending the data portion has failed. Further, one or more actions may be taken by the staging entity to reattempt the request by, for example, requesting that the user resend the data portion.

In some embodiments, the validity map may include a data portion count, whereby the data portion count may represent the number of received data parts. The data portion count may be incremented upon receipt of any data portion (for example, both an overwriting data portion and a non-overwriting data portion may be counted). If a number of data portions are expected and the counted number of received data portions exceeds the number of expected data portions, then it may be concluded that an overwriting data portion has been received and the received data portions may be reconciled to determine the specific data portions that were overwritten. If, however, the number of received data portions is the same as the number of expected data portions, then it may be concluded that an overwriting data portion was not received and the received data portions may be retrieved from the cache.

Figure 10:
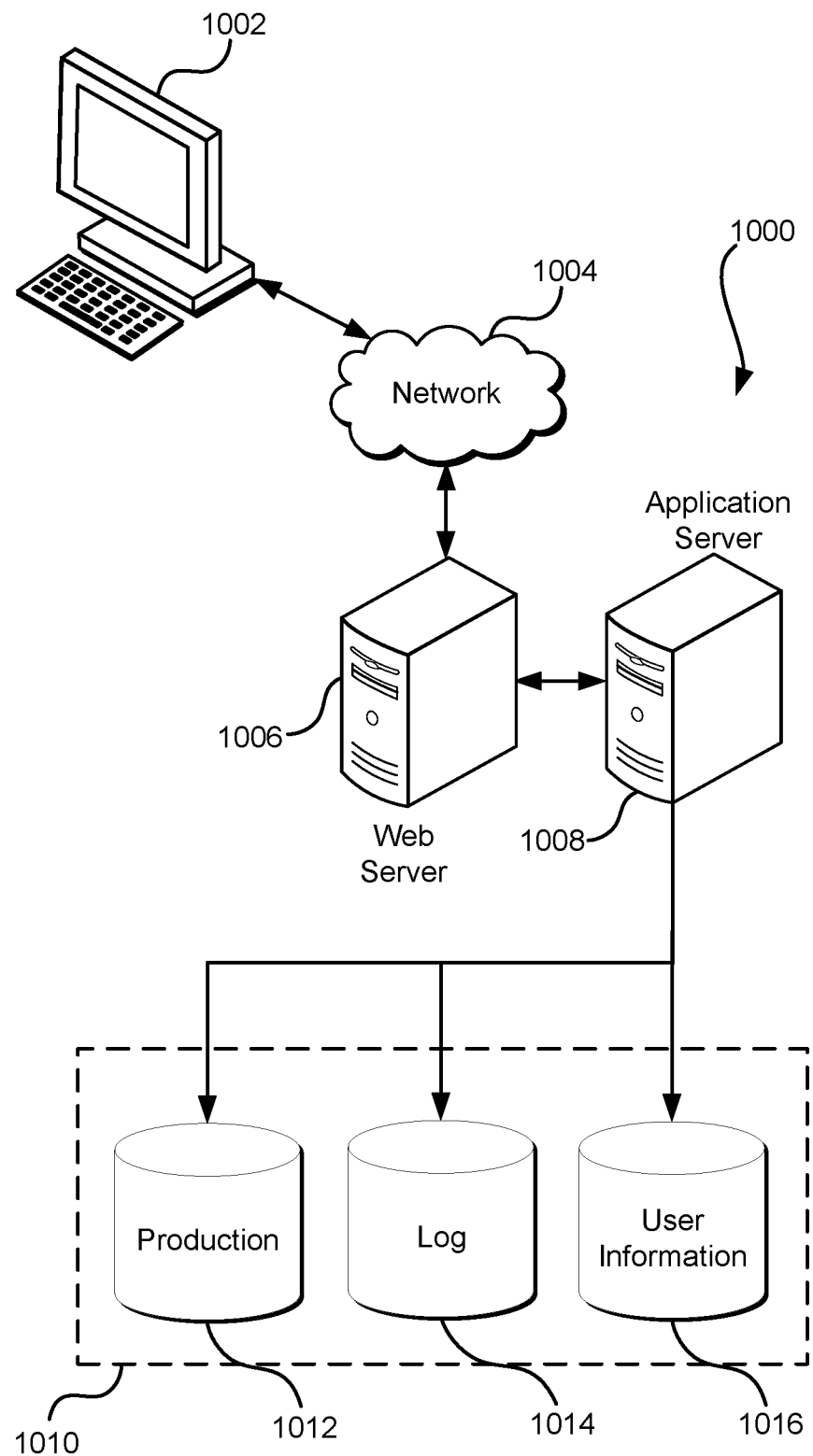
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving data in connection with a storage request, the data to replace previously stored data;
   storing the data in at least a first storage system;
   updating, based at least in part on an outcome of comparing contents of the data relative to the previously stored data in a second storage system, a mapping associated with the first storage system, the second storage system, the data, and the previously stored data, the mapping providing status information for data stored on the first storage system and data stored on the second storage system, the status information comprising at least validity information for the previously stored data in the second storage system, the validity information indicating at least a portion of the previously stored data was overwritten; and
   retrieving, based at least in part on the validity information for the previously stored data, the data from the first storage system.

2. The computer-implemented method of claim 1, wherein the data is retrieved from the first storage system as a result of the mapping indicating that the data overwrites the previously stored data.

3. The computer-implemented method of claim 1, wherein the mapping includes a plurality of bits, each bit of the plurality of bits being associated with a different respective portion of data stored in the first storage system and each bit indicating whether the respective portion of data is overwritten by an associated portion of data stored in the second storage system.

4. The computer-implemented method of claim 1, wherein the second storage system is capable of retrieving the data more quickly than the first storage system.

5. The computer-implemented method of claim 1, wherein the storage request is a request to update the previously stored data with the data.

6. The computer-implemented method of claim 1, wherein the data is a portion of a multipart upload associated with the storage request.

7. A system, comprising:
   memory to store executable instructions that, upon execution by one or more processors of the system, cause the system to:
      receive, by a first storage device, data for storage in a second storage device;
      based at least in part on an indication that the data does not overwrite other data stored on the second storage device, update a mapping to identify that first storage device has received the data and that the second storage device is authoritative for the data, the mapping providing data validity information for at least data stored on the first storage device or data stored on the second storage device, the data validity information comprising data at least usable to determine whether received data includes an overwriting data portion; and
      process a request to retrieve the data by retrieving, based at least in part on the mapping, the data from the first storage device.

8. The system of claim 7, wherein the data is a portion of a multipart upload.

9. The system of claim 8, wherein the instructions further cause the system to:
   receive a different portion of the multipart upload;
   determine that the different portion overwrites other data on the second storage device;
   update the mapping to indicate that the different portion overwrites the other data; and
   process a second request to retrieve the different portion by retrieving, based at least in part on the mapping, the data from the second storage device.

10. The system of claim 8, wherein the multipart upload updates previously uploaded data stored on the second storage device.

11. The system of claim 7, wherein the first storage device has a different performance characteristic than that of the second storage device.

12. The system of claim 11, wherein the performance characteristic is speed of data retrieval.

13. The system of claim 7, wherein the mapping is a bitmap of bits that each correlate with respective portions of data stored on the second storage devices.

14. A non-transitory computer-readable storage medium having collectively stored thereon executable instructions that, upon execution by one or more processors of a computer system, cause the computer system to at least:
   receive data in connection with a storage request, the data to replace previously stored data;
   store the data in at least a first storage system;
   update, based at least in part on an outcome of comparing contents of the data relative to the previously stored data in a second storage system, a mapping associated with the first storage system, the second storage system, the data, and the previously stored data, the mapping comprising validity data for the previously stored data stored in the second storage system, the validity data indicating at least a portion of the previously stored data was overwritten; and
   retrieve, based at least in part on the validity data for the previously stored data, the data from the first storage system.

15. The non-transitory computer-readable storage medium of claim 14, wherein the instructions that cause the computer system to retrieve the data further include instructions that cause the computer system to determine that all of the data associated with the storage request have been received.

16. The non-transitory computer-readable storage medium of claim 14, wherein the instructions further comprise instructions that, upon execution by the one or more processors, cause the computer system to:
   receive an instruction indicating that upload of the data is complete; and
   as a result of receiving the instruction, compare the contents of the data with the previously stored data to update the mapping.

17. The non-transitory computer-readable storage medium of claim 14, wherein the instructions further comprise instructions that, upon execution by the one or more processors, cause the computer system to retrieve, based at least in part on the mapping, the data from the first storage system on a condition that the data overwrites the previously stored data.

18. The non-transitory computer-readable storage medium of claim 14, wherein the storage request is received via a programmatic interface associated with the computer system.

19. The non-transitory computer-readable storage medium of claim 14, wherein the instructions further comprise instructions that, upon execution by the one or more processors, cause the computer system to, on a condition that updating the validity map fails, requesting resubmission of the data from a requestor associated with the storage request.

20. The non-transitory computer-readable storage medium of claim 14, wherein the first storage device is associated with an archival storage service.

\* \* \* \* \*